3,002,861
METHOD OF PRODUCING A COATING OF BARIUM TITANATE
Lydia A. Suchoff, Shrewsbury, N.J., assignor to the United States of America as represented by the Secretary of the Army
No Drawing. Filed June 7, 1957, Ser. No. 664,443
1 Claim. (Cl. 117—169)
(Granted under Title 35, U.S. Code (1952), sec. 266)

The invention described herein may be manufactured and used by or for the Government for governmental purposes, without the payment of any royalty thereon.

This invention relates to a method of providing a very thin adherent coating of barium titanate having ferroelectric properties.

Barium titanate owes its great importance to the fact that its dielectric constant is about 100 times higher than that of conventional dielectric materials provided its compositional and structural purity is extremely high. The value of crystalline barium titanate bodies as used, for instance, in computer elements, magnetic amplifiers, memory devices, etc., depends on both the compositional and the structural purity of the barium titanate crystals. This purity will, in turn, depend on the purity of the raw materials used in manufacturing the barium titanate compound and on the particular methods of manufacture which determine the size, homogeneity, and the structural purity of the crystals.

It has been known to make barium titanate by dry mixing barium carbonate and titanium carbonate or by dry mixing barium oxalate and titanium oxalate and then heating the dry mixture of these compounds to temperatures high enough to bring about a solid state reaction yielding barium titanate. To obtain the desired small particle size these solid state reaction products have to be ground. However, small portions of the barium and titanium compounds may not have reacted with each other and may therefore be present as such in the finished product. The barium titanate thus obtained will therefore be contaminated with barium compounds and titanium compounds. Besides, it is rather difficult to get a homogeneous particle size soley by mechanical grinding operation. Therefore, the barium titanate particles made according to this known method are far from having a high degree of compositional and structural purity and do not exhibit a homogeneous particle size.

Due to the high dielectric constant of barium titanate it would be extremely valuable to prepare a thin film of barium titanate of high purity on a base of metal, glass, plastics, mica or similar materials as used for instance in capacitors and similar electric equipment. If a conventional suspension of very finely ground barium titanate in a volatile organic solvent is used for coating the base metal, the resulting film after evaporation of the organic solvent consists of a conglomeration of little crystals. These single crystals coalesce in one area while pin holes are formed in other areas and therefore the film becomes uneven, that is, rather thick in one part and too thin in others. In my patent application Serial Number 648,980, filed March 27, 1957, I have described a method of producing barium titanate of extremely high compositional and structural purity in form of very small crystals of homogeneous size by reacting in an inert organic solvent barium alcoholate with titanium alcoholate and thereupon removing the solvent by evaporation at elevated temperature to obtain ultra pure barium titanate.

I now have found that some of the mixtures of barium alcoholate and titanium alcoholate in an inert organic solvent may advantageously be used for the manufacture of an extremely thin homogeneous, ultra pure ferroelectric barium titanate film of excellent dielectric properties, by applying said mixtures to a surface in form of a thin layer and evaporating the liquid phase from that layer whereby a solid, strongly adherent film of barium titanate is formed upon said surface.

The invention will become more apparent from the following description of specific embodiments.

*Example.*—99.4 cc. of barium methylate (containing 7.40% of barium) are diluted with about 100 cc. of methylalcohol whereupon 14.53 ml. of titanium isopropylate (containing 17.59% titanium) are added. The mixture is diluted to 250 ml. with additional methylalcohol and will then contain 3.966% by weight of barium titanate in form of barium and titanium ions.

A glass or metal plate after having been thoroughly cleaned is now dipped into this mixture and the plate is then heated in an oven above about 120° C. to dryness. A barium titanate coating is thereby formed in situ directly on the surface of the plate from the two constituents and this coating or film will consist of extremely small single crystals of barium titanate as they are first formed as a result of the reaction between the barium methylate and the titanium isopropylate. Therefore the film will have a very uniform structure and will strongly adhere to the surface of the plate.

If the barium titanate film according to the invention is made on a glass slide, a part of which remains uncoated, no distinction is observable in transmitted light between the uncoated and the coated portion of the glass slide. In reflected light, however the part coated with barium titanate according to the method of the present invention will show light interference patterns, proving that the coating consists of a uniform and extremely thin film. If however the glass slide would be dipped into a suspension of finely ground barium titanate in a volatile organic solvent the resulting film after driving off the solvent would appear opaque both in transmitted and reflected light.

Instead of barium methylate other alcoholates such as those of ethyl, propyl or isopropyl alcohol may be used. Butylalcohol or other still higher alcohols are not recommended because their surface tension is too high to permit uniform wetting of the surface. Besides the boiling point of higher alcohols is very high and therefore the rate of their evaporation very slow which leads to various difficulties in the process of applying and drying the liquid film. To obtain optimum thickness and uniformity only low boiling alcohols having low surface tension and low boiling points should be used.

What has been said about substitution of barium methylate by other alcoholates is equally true for the substitution of titanium isopropylalcoholate by other alcoholate except for titanium methylate which is a solid at room temperatures and therefore practically excluded from being usable.

Generally the film forming solution should contain about 4% by weight of barium and titanium ions to secure a continuous homogeneous film. If less than 4% are used the plate has to be dipped more than once to build up the desired film thickness and continuity; if considerably more than 4% are used the crystals will grow on drying to a larger size which will prevent strong adherence to the surface.

All ingredients used to make the film forming solution have to be absolutely free of water; otherwise precipitation will occur due to hydrolyzation of the barium and titanium alcoholates to their respective oxides.

The film forming solution made according to the present invention may be applied to the surface that is to be coated by any conventional method such as dipping, painting, spraying, etc. The thickness of the film obtained will depend upon the extent of the dilution of the barium and titanium ions in the film forming solution and on the number of times the surface to be coated is treated with the solution.

The barium titanate coating made according to the present invention shows a very high dielectric constant and is mechanically very resistant.

What is claimed is:

A method of forming a strongly adherent, extremely thin and uniform film of barium titanate of high dielectric constant upon a surface consisting essentially of mixing a barium alcoholate selected from the group of barium methylate, barium ethylate, barium propylate and barium isopropylate with a titanium alcoholate selected from the group of titanium ethylate, titanium propylate and titanium isopropylate, in an organic solvent of a low boiling point to obtain a film-forming solution containing about 4% by weight of barium and titanium ions, applying a thin layer of said diluted solution upon the surface to be coated and drying off the organic solvent by heating at a temperature of about 120° C. whereby a strongly adherent film of barium titanate is formed in situ upon the surface to be coated.

References Cited in the file of this patent

Organic Finishing, May 1953, pages 23–24.